United States Patent [19]

Briles

[11] E Re. 30,997

[45] Reissued Jul. 20, 1982

[54] TAPER HEADED FASTENER TO INCREASE WORK FATIGUE LIFE

[76] Inventor: Franklin S. Briles, 1301 Dolphin, Corona del Mar, Calif. 92625

[21] Appl. No.: 3,867

[22] Filed: Jan. 16, 1979

Related U.S. Patent Documents

Reissue of:

[64] Patent No.: 4,050,833
Issued: Sep. 27, 1977
Appl. No.: 600,388
Filed: Jul. 30, 1975

[51] Int. Cl.[3] ..... F16B 5/02

[52] U.S. Cl. ..... 403/388; 403/405; 411/500

[58] Field of Search ..... 403/388, 404, 405; 52/758 F, 758 C; 85/9 R, 37

[56] References Cited

U.S. PATENT DOCUMENTS

| | | | |
|---|---|---|---|
| 3,680,429 | 8/1972 | Briles | 85/37 |
| 3,682,508 | 8/1972 | Briles | 403/408 X |
| 3,748,948 | 7/1973 | Schmitt | 85/37 X |
| 3,821,871 | 7/1974 | Schmitt | 403/408 |
| 3,840,980 | 10/1974 | Auriol | 85/37 X |
| 4,050,833 | 9/1977 | Briles | 403/388 X |

*Primary Examiner*—Wayne L. Shedd
*Attorney, Agent, or Firm*—William W. Haefliger

[57] ABSTRACT

A threaded fastener incorporates a conical head and has a shank section closest the head that is tapered to interfere with the workbore and displace work material creating an annular bulge at the work surface bounding the head.

9 Claims, 5 Drawing Figures

TAPER HEADED FASTENER TO INCREASE WORK FATIGUE LIFE

Matter enclosed in heavy brackets [ ] appears in the original patent but forms no part of this reissue specification; matter printed in italics indicates the additions made by reissue.

BACKGROUND OF THE INVENTION

This invention relates generally to fasteners and more particularly concerns aircraft type fasteners having interference fit with a work member or members. It basically concerns positive connection of structural members as distinguished from riveted connection of thin skins.

Flush type fastener heads normally are conical in shape to be received in countersunk recesses in the work. There is a continuing problem of tension fatigue in the work surrounding such heads. Repeated bending of the work, as in aircraft structures, produces alternating tension loading of the work panel. The formation of countersinks reduces the straight bore surface areas and the strength of the work panel. Also the reduced nonuniform area of contact of the head against the countersink creates uneven annular clampup, inducing fretting. Another problem results from the use of plated interference fasteners, as for example cadmium plating. It is found that the plate tends to shear off upon engagement with the annular corner or edge between the countersink and straight bore surfaces of the work. The removed material then gathers under the head to block full seating of the head against the countersink surface of the work, resulting in corrosion when fluid enters the gap to reach the fastener surface from which plate has been removed. While various expedients have been resorted to in efforts to alleviate these problems, none of these efforts have provided the unusual advantages in design simplicity, mode of operation and results as are now afforded by the present invention.

SUMMARY OF THE INVENTION

Basically, the method of the invention involves the steps that include:

a. forcibly inserting the shank forwardly into a workbore to radially outwardly cold work or deform material at a first location about the shank and proximate the head, and b. transferring such deformation to produce an annular rearward bulge in the work material at a second location closely bounding the outermost periphery of the head to pre-load the work around the outermost edge extent of the head.

Typically, the work forms a bore having a countersunk recess, the head is conical to be received in the bore and recess, and the head is forcibly fully engaged against that surface at the time the rearward bulge is produced, whereby the resilient loading exerted by the bulge on the head periphery does not interfere with full seating of the head against the recess surface, with the head rear face flush with the work. Also, plating on the fastener is not sheared off when the bore and shank are both tapered. In this regard, it is thought that cold working of the work material adjacent the conical recess surface (as a result of head seating against that surface) causes full transmission of compressive deflection of the material from the first location to the second location to produce the bulge which pre-loads the work around the outer edge of the head in radial compression and peripheral tension. This substantially reduces tension fatigue at that reduced strength section, and which is produced upon alternating bending tension loading of the work. To my knowledge, this simple method and extremely advantageous result have never before been attained in the simple and expeditions manner as now afforded by the invention.

Structurally, the new fastening assembly includes a. a fastener head and shank, the head being conical to closely interfit the work countersink surface, b. the shank defining first, second and third sections in a lengthwise axially forward sequence away from the head, the third section being threaded to receive a tightening nut, the second section having an outer diameter closely fitting the workbore diameter, c. the first section being conically tapered forwardly from the head and toward the second section and being sufficiently oversized in relation to the workbore that interference force develops in response to forward displacement of the fastener into the work, thereby to effect displacement of work material between the two locations referred to above.

As will appear, the work panel has a rear side face which forms a rearward bulge extending annularly at the second location and against the periphery of the head, when the fastener is fully seated; the work material bounding the fastener first section is deformed radially outwardly to define a bore taper the same as the fastener first section taper; and a nut tightened on the threaded section draws the fastener into the work to produce the bulge, the fastener head conical surface being everywhere fully seated against the work countersunk surface.

These and other objects and advantages of the invention, as well as the details of illustrative embodiments, will be more fully understood from the following description and drawings, in which:

DRAWING DESCRIPTION

DETAILED DESCRIPTION

Figure 1:
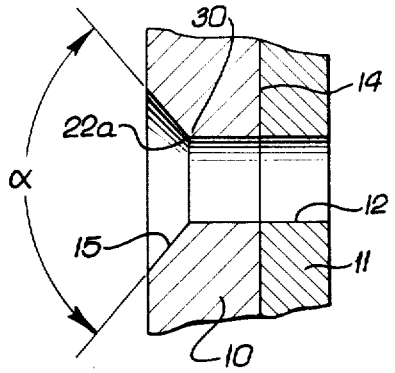
FIG. 1 is an elevation taken in section, to show the bore and countersink formed in work panels.

In FIG. 1, the work structure is shown to include two panels 10 and 11 into which a straight, i.e. non-tapered cylindrical bore 12 has been drilled or otherwise formed. If desired, a bonding agent may be applied at panel interface 14. A conical countersink surface is also formed at 15, and the countersink taper angle $\alpha$ may, for example be about 100°, on an included conical angle basis.

Figure 2:
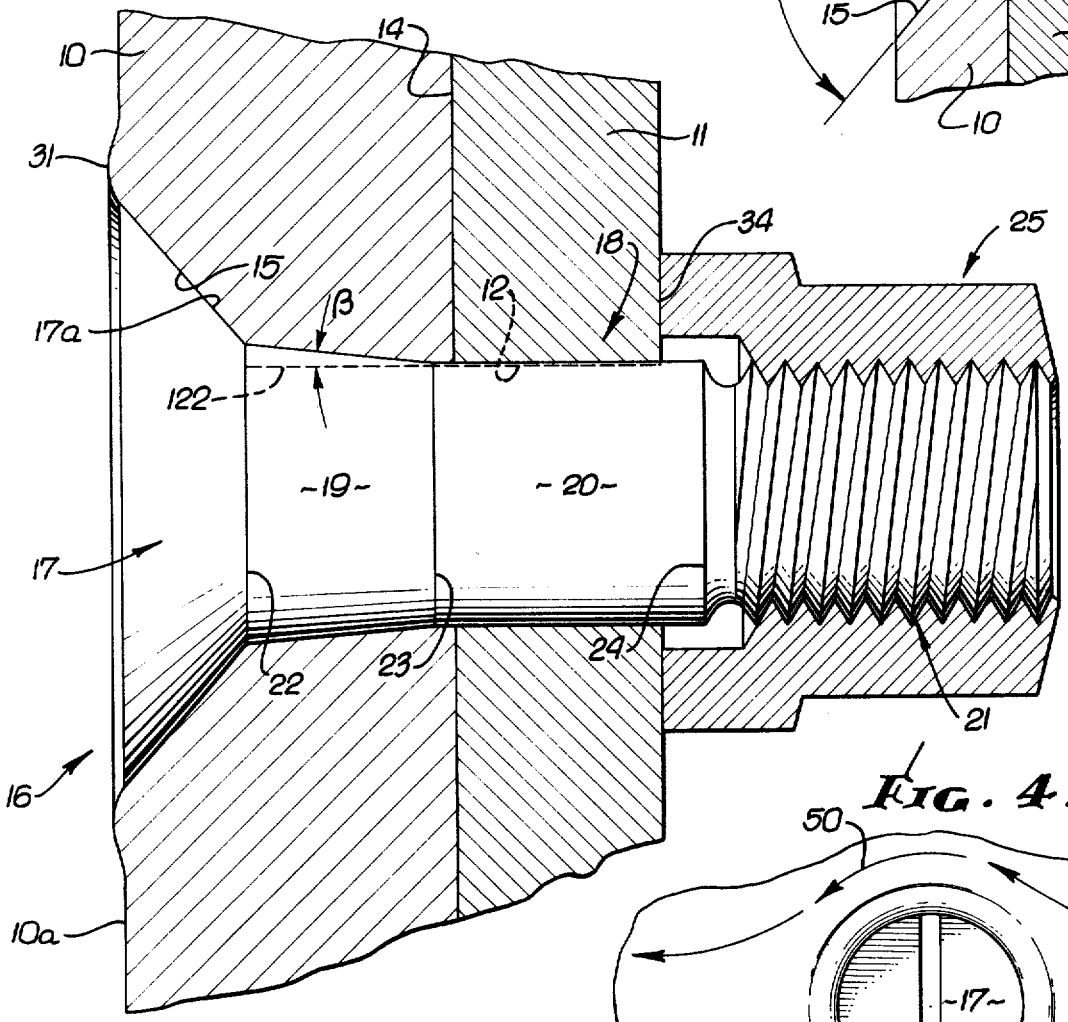
FIG. 2 is an enlarged elevation, taken in section, and showing a fastener fully inserted into the work.

Extending the description to FIG. 2, the fastener 16 shown as interconnecting the panels comprises a head 17 and shank 18, the head surface 17a being conical to closely interfit the work countersink surface 15.

The shank 18 defines first, second and third sections 19, 20 and 21 in a lengthwise extending sequence away from the head, their junctions being indicated at 22, 23 and 24. Third section 21 is threaded, as shown, to receive a tightening nut 25. Cylindrical second section 20 has an outer diameter closely fitting the inner diameter of the work bore 12. For best results, there should be between 0.004 inch overall clearance and 0.004 inch overall interference between the section 20 and bore 12, so that the work adjacent the bore is cold worked in response to forcible insertion of the fastener section 20 into the bore. Typically, the bore initial diameter is nominally 0.246 inches, and the diameter of section 20 is nominally 0.248 to 0.249 inches. In this regard, the work panels may typically consist of a metal or metals of less hardness than the fastener metal; for example, the fastener may consist essentially of titanium and the work of aluminum.

The first section 19 is conically tapered forwardly from the head and toward section 20; further, section 19 is sufficiently oversized in relation to the workbore that interference forces develop in response to forward displacement of the fastener into the work, thereby to effect displacement of work material between first and second locations defined as follows: the first location 30 is proximate the initial junction 22a between bore 12 and countersink surface 15, and the second location is at the work surface adjacent and bounding the countersink surface. As seen in FIG. 2, the second location is defined by a rearward bulge 31 extending annularly at the second location, and is produced in response to radially outward deformation of the work material at the first location by section 19. In addition, no bulging is produced at the work countersink surface 15, provided that the relationships as referred to are maintained. Further, the work material appears to be cold worked at and between the locations 30 and 31 sufficiently that fatigue strength is very substantially increased over what is produced when all dimensions are maintained, except that section 19 is not tapered but has the outer diameter of section 20, and no bulge appears at 31. For example, fatigue strength tests show over 100% increase in cycles to failure when the fastener has the taper at section 19, and bulge 31 is produced. In this regard, nut 25 is tightened on section 21 and against the work at interface 34, until the head 15 is seated and the bulge 31 is produced.

Figure 3:
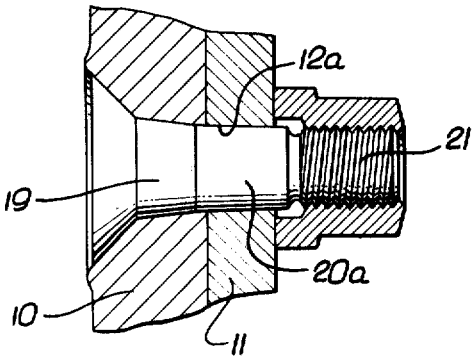
FIG. 3 is like FIG. 2, but showing a structural modification.

In FIG. 3 the dimensions of the fastener and work are the same as in FIG. 2; however the fastener second section 20a has a slight forward taper, i.e. is slightly conical, and the work bore 12a also has an initial and final forward taper such that interference develops between the section 20 and 12a when the fastener is tightened, that interference being less than about 0.004 inches. Preferably, the taper angularity of section 20a is less than the taper angularity of first section 19.

In FIG. 2, the taper angularity of section 19 is indicated at $\beta$, the initial bore surface (before deformation) being indicated by broken line 122. Angle $\beta$ is less than about 4°, and greater than about ½°, to assure formation of bulge 31 as described. Further, the total interference between the fastener and work at junction 23, for straight or tapered bores should be between 0.002 and 0.012 inches and the length of section 19 should be less than 0.180 inches, for bulge formation, when the diameter of section 20 is about 0.248 inches. Under these conditions, the axial overall height of the bulge from the rear face 10a of panel 10 is no greater than about 0.002 inches.

Figure 4:
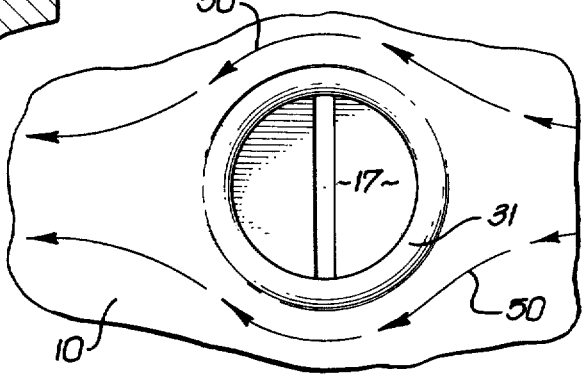
FIG. 4 is an end elevation showing the fastener head and surrounding bulge.

In FIG. 4, the bulge 31 is shown acting to deflect stress lines 50 in the work around the bulge, and thus away from the reduced thickness section of the work under the head and formed by the countersink 15.

Figure 5:
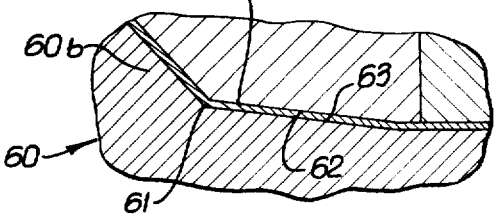
FIG. 5 is a fragmentary section taken through a plated fastener seated in the work in the same manner as in FIG. 2.

FIG. 5 illustrates the use of a modified fastener 60 of the same form as shown in FIG. 2. The fastener includes surface plating, as for example cadmium plate 60a. Note that the latter is not sheared off the fastener main extent 60b by work corner 61. In this regard, the work is initially tapered at 62 to match the fastener taper at 63, and is outwardly displaced upon full insertion of the fastener into the work. The thickness of the plate 60a is typically between 0.0002 and 0.0004 inches.

I claim:

1. In a fastening assembly capable of displacing work material between first and second locations, the first location being proximate the junction between a workbore and a conical countersink surface in the work, the second location being at the work surface adjacent and closely bounding the countersink surface, the combination that comprises:

a. a fastener head and shank, the head being conical to closely interfit the work countersink surface, the conical head defining an included conical angle of at least about 100°, b. the shank defining first, second and third sections in a lengthwise axially forward sequence away from the head, the third section being threaded to receive a tightening nut, the second section being cylindrical and having an outer diameter to closely fit the workbore diameter, c. the first shank section being conically tapered forwardly away from the head and toward the second section and being sufficiently oversized in relation to the workbore that interference force will develop in response to forward displacement and seating of the fastener into the work, thereby to effect said displacement of work material between said locations, said first section taper being less than about 4° and greater than about ½°, the work to include first and second panels, the combined axial extents of said conical head and said shank first section being less than the thickness of said first panel, whereby said first section will be located entirely within the first panel, d. the work to have a rear side face into which said countersink is sunk, whereby when said fastener is seated in said work said work rear side face will form a rearward bulge extending annularly about the rearward facing side of the head at said second location, the entirety of the bulge being immediately proximate to the radially outermost periphery of the head.

2. The combination of claim 1 wherein the total interference between the work bore and the shank diameter at the junction between the head and the first section will be less than 0.012 inches and greater than 0.002 inches, and the length of said first section is less than 0.180 inches.

3. The combination of claim 1 wherein the work material bounding said fastener first section is deformed radially outwardly to define a bore taper the same as the first section taper.

4. The combination of claim 3 wherein the total interference between the work bore and the shank diameter at the junction between the head and the first section will be less than 0.012 inches and greater than 0.002 inches, and the length of the first section is less than 0.180 inches.

5. The combination of claim 4 wherein the diameter of the shank second section is substantially the same as the bore.

6. The combination of claim 3 wherein the overall height of said bulge axially rearwardly relative to a plane defined by said rear face will be less than 0.002 inches.

7. In a fastening assembly capable of displacing work material between first and second locations, the first location being proximate the junction between a workbore and a conical countersink surface in the work, the second location being at the work surface adjacent and closely bounding the countersink surface, said work including first and second panels, comprising:

a. a fastener head and shank, the head being conical to closely interfit the work countersink surface, b. the shank defining first, second and third sections in a lengthwise axially forward sequence away from the head, the third section being threaded to receive a tightened nut, the second section being cylindrical and having an outer diameter to closely fit the workbore diameter, the combined axial lengths of said conical head and said shank first section being less than the thickness of said first panel, c. the first section being conically tapered forwardly away from the head and toward the second section and being sufficiently oversized in relation to the workbore that interference force will develop in response to forward displacement of the fastener into the work, thereby to effect said displacement of work material between said locations, d. said first section taper being less than about 4° and greater than ½°, the first section to be located entirely within a first work panel;

e. the work to have a rear side face into which said countersink is sunk, whereby when said fastener is seated in said work said work rear side face will form a rearward bulge extending annularly about and immediately proximate the rearward facing side of the head at said second location, the bulge will have an overall height axially rearwardly relative to a plane defined by said rear face less than substantially 0.002 inches.

*8. In a fastening assembly capable of displacing work material between first and second locations, the first location being proximate the junction between a workbore and a conical countersink surface in the work, the second location being at the work surface adjacent and closely bounding the countersink surface, the combination that comprises:*

*(a) a fastener head and shank, the head being conical to closely interfit the work countersink surface, the conical head defining an included conical angle of at least about 100°,*

*(b) the shank defining first, second and third sections in a lengthwise axially forward sequence away from the head, the third section being threaded to receive a tightening nut, the second section being cylindrical and having an outer diameter to closely fit the workbore diameter,*

*(c) the first shank section being conically tapered forwardly away from the head and toward the second section and being sufficiently oversized in relation to the workbore that interference force will develop in response to forward displacement and seating of the fastener into the work, thereby to effect said displacement of work material between said locations, said first section taper being less than about 4° and greater than about ½°, the work to include first and second panels, the combined axial extents of said conical head and said shank first section being less than approximately the thickness of said first panel, whereby said first section will be substantially entirely located within the first panel,*

*(d) the work to have a rear side face ito which said countersink is sunk, whereby when said fastener is seated in said work said work rear side face will form a rearward bulge extending annularly about the rearward facing side of the head at said second location, the entirety of the bulge being immediately proximate to the radially outermost periphery of the head,*

*(e) the overall height of said bulge axially rearwardly relative to the plane defined by said rear face being less than 0.002 inches when the fastener is seated in said work, the fastener and work being metallic.*

*9. In a fastening assembly capable of displacing work material between first and second locations, the first location being proximate the junction between a workbore and a conical countersink surface in the work, the second location being at the work surface adjacent and closely bounding the countersink surface, the combination that comprises:*

*(a) a fastener head and shank, the head being conical to closely interfit the work countersink surface, the conical head defining an included conical angle of at least about 100°,*

*(b) the shank defining first, second and third sections in a lengthwise axially forward sequence away from the head, the third section being threaded to receive a tightening nut, the second section being cylindrical and having an outer diameter to closely fit the workbore diameter,*

*(c) the first shank section being conically tapered forwardly away from the head and toward the second section and being sufficiently oversized in relation to the workbore that interference force will develop in response to forward displacement and seating of the fastener into the work, thereby to effect said displacement of work material between said locations, and said first section taper being less than about 4° and greater than about ½°, the work to include first and second panels,*

*(d) the work to have a rear side face into which said countersink is sunk, whereby when said fastener is seated in said work said work rear side face will form a rearward bulge extending annularly about the rearward facing side of the head at said second location, the entirety of the bulge being immediately proximate to the radially outermost periphery of the head,*

*(e) the overall height of said bulge axially rearwardly relative to a plane defined by said rear face being less than 0.002 inches when the fastener is seated in said work, the fastener and work being metallic,*

*(f) the total interference between the work bore and the shank diameter at the junction between the head and the first section being less than 0.012 inches and greater than 0.002 inches, and the length of the first section being less than 0.180 inches,*

*(g) the combined axial extents of said conical head and said shank first section being less than approximately the thickness of said first panel, whereby the first section will be located substantially entirely within the first panel.*

* * * * *